Figures 1A, 1B:
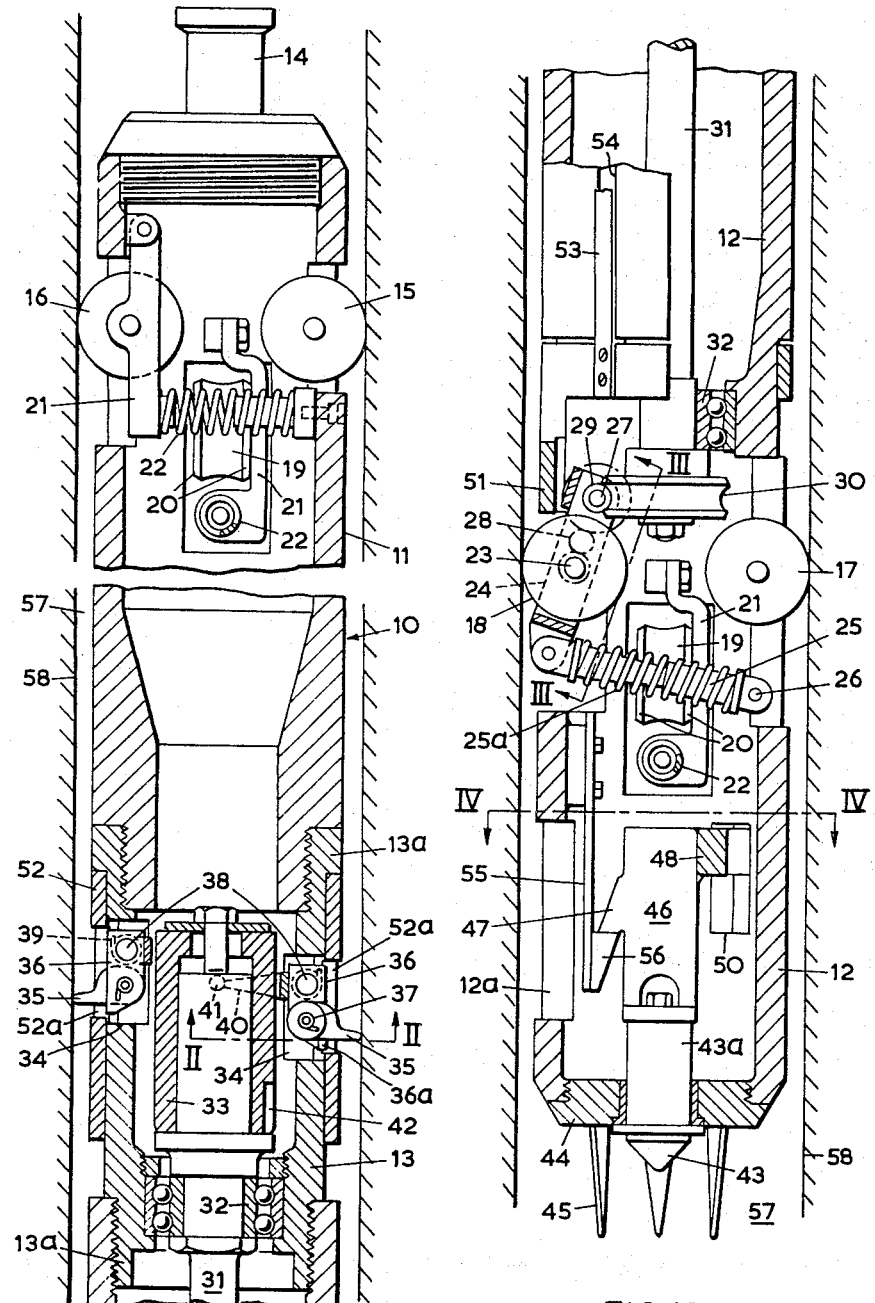

May 17, 1966 J. F. TYRRELL ETAL 3,251,136
HOLE MEASURING DEVICES
Filed Jan. 24, 1964 3 Sheets-Sheet 3

United States Patent Office 3,251,136
Patented May 17, 1966

3,251,136
HOLE MEASURING DEVICES
Joseph Francis Tyrrell and Ambrus Janko, Whetstone, England, assignors to The English Electric Company Limited, London, England, a British company
Filed Jan. 24, 1964, Ser. No. 340,043
Claims priority, application Great Britain, Feb. 5, 1963, 4,621/63
6 Claims. (Cl. 33—178)

This invention relates to hole measuring devices for measuring changes in an internal wall contour for the length of a hole of which the length is substantially greater than the width.

According to the invention, such a device comprises a body portion movable axially in the hole, guiding means carried by the body portion for guiding the device along the hole according to a datum predetermined with respect to the axis of the hole, sensing means carried by the body portion and arranged for movement relative to the body portion in response to changes in wall contour of the hole with respect to said datum, and recording means carried by the body portion, responsive to movement thereof along the hole and coupled to said sensing means for making a record of said contour in response to said movements of the body portion and of the sensing means.

According to a preferred feature of the invention, said predetermined datum comprises two mutually perpendicular reference planes intersecting on a longitudinal axis of the body portion, and guiding means are arranged to maintain the device with respect to said reference planes during movement thereof along the hole, and the sensing means are arranged with respect to the guiding means, so that said movement of the sensing means is always in said reference planes.

According to another preferred feature of the invention, the guiding means comprise two pairs of wall-engaging members in each reference plane, the wall-engaging members of each pair being on opposite sides of the reference plane perpendicular to the reference plane in which the said pair lies. Preferably each wheel engaging member has a guiding wheel arranged to rotate in contact with the wall of the hole.

According to a further preferred feature of the invention, each guiding wheel has at least two parallel treads for engaging the wall of the hole.

According to another preferred feature of the invention, the sensing means include at least one feeler arranged to project laterally from the body portion. Preferably the or each feeler is rotatable into the body portion from its projecting position.

According to yet another preferred feature of the invention, the recording means comprise a record-bearing member rotatable in response to movement of the body portion along the hole, and record-making means for making a continuous record on said record-bearing member as the record-bearing member rotates and in response to said movement of the sensing means.

According to a still further preferred feature of the invention, the device includes driving means coupled between one said guiding wheel and the record-bearing member so as to rotate the record-bearing member when the guiding wheel rotates.

Preferably the guiding wheel to which the driving means are coupled is retractable into the body portion from its wall-engaging position.

Figures 2, 3:
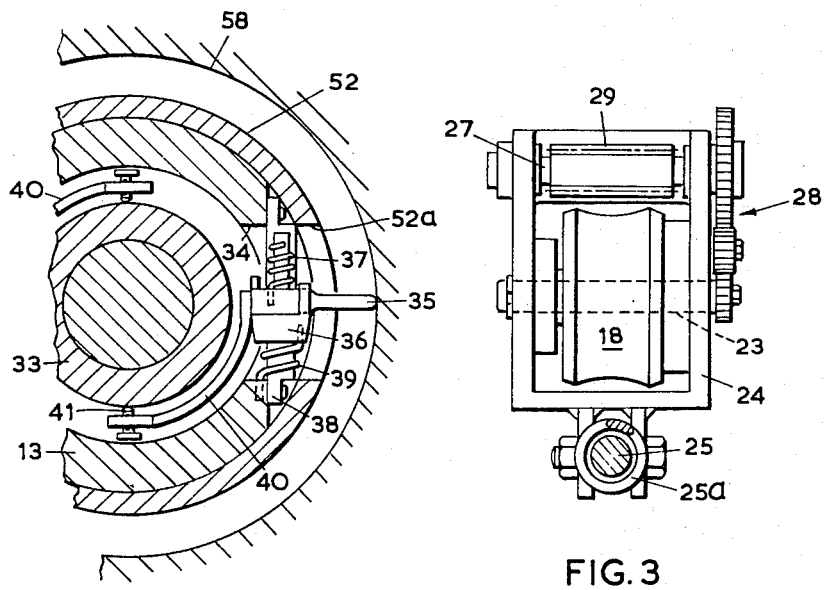
Figure 4:
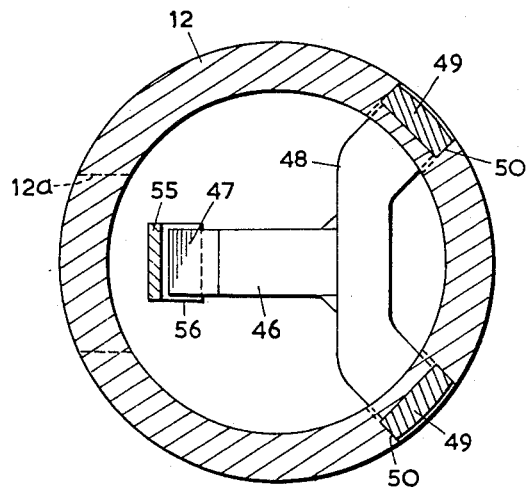
Figure 5:
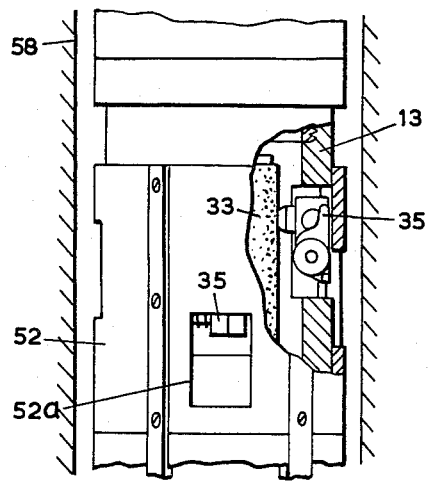
Figure 6:
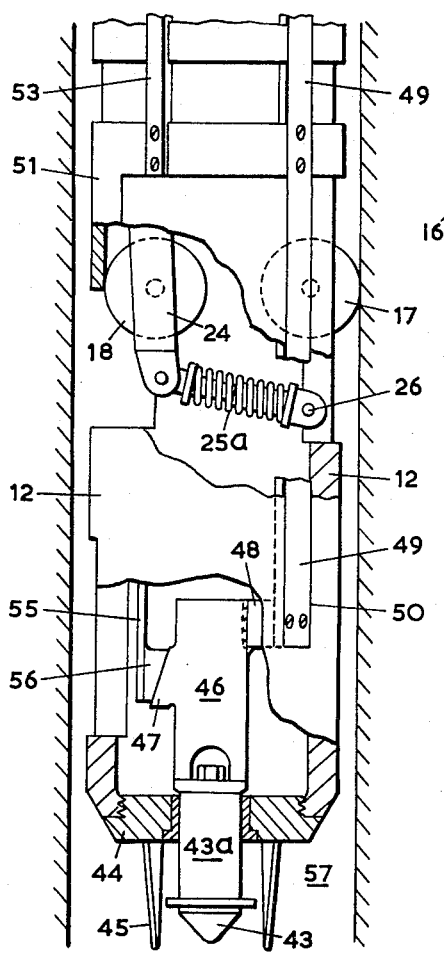
Figure 6:
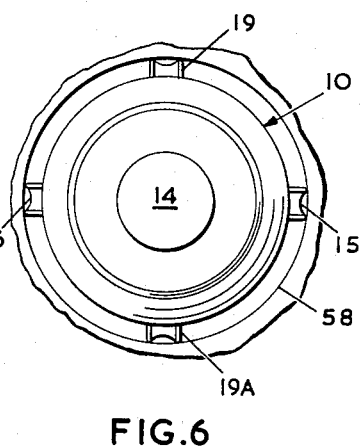

A hole-measuring device incorporating features of the invention, for measuring the contours of vertical fuel and control-rod channels in a graphite-moderated-nuclear reactor, will now be described by way of example and with reference to the accompanying drawings, of which:

FIG. 1, which for convenience is split into an upper part FIG. 1(A) and a lower part FIG. 1(B), is a part-sectional elevation showing the device in its operating position in one channel in the reactor;
FIG. 2 is a sectional plan taken on the line II—II of FIG. 1;
FIG. 3 is a view taken on the line III—III of FIG. 1;
FIG. 4 is a section plan taken on the line IV—IV of FIG. 1;
FIG. 5 is a part-sectional elevation showing part of the device in a non-operating position;
FIG. 6 is a plan view of the device in the said operating position.

The hole-measuring device has a long cylindrical body 10 comprising an upper housing 11, a lower housing 12 and a central body member 13 which has an annular end portion 13a at each end. The housings 11 and 12, which are hollow, are screwed concentrically one into each end portion 13a of the body member 13. An extension piece 14, arranged so as to be gripped by a grabhead (not shown), is provided at the top end of the upper housing 11.

The device has eight guiding wheels, four of which are adjacent each end, for guiding the device along a hole or channel. The guiding wheels are denoted by the numerals 15 to 19 and 19A: the wheels 15 and 16 are near one end of the device, while near the other end are another guiding wheel 17 and a driving and guiding wheel 18. The wheels 15 to 18 are all arranged so as to rotate in the same diametral plane. Two pairs of further wheels 19, 19A visible in FIGS. 1 and 6, are similarly provided, one pair at each end of the body: the wheels 19, 19A are all arranged for rotation in the diametral plane at right angles to that in which the wheels 15 to 18 rotate. These two diametral planes are hereinafter referred to as reference planes. All the guiding wheels project radially outwards from the body and each one is formed with two parallel treads 20. The wheels 15 and 17 are free to rotate on axes fixed with relation to the body, as are the two wheels 19A; while each of the wheels 16 and 19 is mounted for rotation on an arm 21 pivoted at one end and biased outwardly by a compression spring 22 acting at its other end. The driving wheel 18 is keyed to an axle 23 which is mounted for rotation on an arm 24, to one end of which is pivoted a telescopic limb 25 which in turn is pivoted to the lower housing 12 as indicated at 26. A compression spring 25a biases the arm 24 and wheel 18 outwardly. The other end of the arm 24 is pivoted on a shaft 27, which is free to rotate in bearings (not shown) in the housing 12 and which is driven, through a train of spur gears (indicated at 28 in FIG. 1), by the axle 23 on which the wheel 18 is mounted. Mounted on the shaft 27 is a worm 29, which engages a worm wheel 30 rigidly mounted on one end of a drive shaft 31. The latter is mounted axially for rotation in two bearings 32 in the body of the device.

On the other end of the drive shaft 31 a cylindrical recording drum 33 is rigidly but detachably mounted; the outer surface of the drum 33 is treated with a carburized preparation suitable for showing scratches made by a sharp point.

Four rectangular holes 34 are formed in the central body member 13 of the device, and in each hole 34 there is mounted an outwardly-projecting feeler 35, pivoted on a feeler arm 36 and biased outwardly by an operating spring 37. The feelers 35 (two of which are visible in FIG. 1) are equally spaced around the circumference of the body member 13, and are arranged so that each feeler can move, about its axis on the corresponding feeler arm 36, in one or other of the two reference planes before mentioned. Each feeler arm 36 is pivoted on a shaft 38 which is fixed to the body member 13 and which is biased by a loading spring 39 towards the position shown in FIG. 1, in which the tip of the corresponding feeler 35 is urged outwardly. To each feeler arm 36 there is rigidly attached one end of a curved spring arm 40, which carries at its outer end a sharp-pointed steel stylus 41 which is urged by the spring arm against the surface of the recording drum 33. On the surface of the drum 33, at the lower end as seen in FIG. 1, a longitudinal slot 42 is formed and is so positioned that the stylus 41 nearest the support bearing 32 will enter the slot 42 after the drum has rotated once, so as to lock the drum 33 against further rotation.

An axially-extending conical probe 43, at the lower end of the lower housing 12, has a cylindrical extension 43a which is free to move axially in an end cap 44 fitted to the end of the housing 12. Four equally-spaced guiding prongs 45, extending axially outwards and arranged on a pitch circle surrounding the probe 43, are attached to the end cap 44. Bolted to the inner end of the probe extension 43a is a trigger assembly, comprising a trigger plate 46 with a laterally-projecting lug 47, and a saddle plate 48 which is attached to the trigger plate and to each of the two ends of which is bolted a sleeve-operating rod 49. Each sleeve-operating rod 49 extends longitudinally along the body of the device in a slot 50 formed in the housing 12.

Fixed to both the sleeve-operating rods 49 is a locking sleeve 51 which is concentric with the housing 12 and which, in the position shown in FIG. 5, retains the wheel 18 within the housing 12. The sleeve 51 can be moved longitudinally by the rods 49 from this position to that shown in FIG. 1 so that the driving wheel 18 is free to be urged radially outwards by the spring 25a.

Another locking sleeve 52 (shown only in FIG. 1), having four slots 52a, through each of which there can project one of the feelers 35 when the sleeve 52 is in the position shown in FIG. 1, is arranged co-axially with the centre body member 13 and is attached rigidly to one end of each sleeve-operating rod 49 and to two further sleeve-operating rods 53. The rods 53 are arranged in longitudinal slots 54 in the body and are also attached to the sleeve 51.

A locking spring arm 55 fixed within the housing 12 carries at its lower end a pawl 56 which engages the lug 47 on the trigger plate 46. A slot 12a is provided in the wall of the housing 12, adjacent the spring arm 55, to allow the latter to move radially outwards.

In operation, when it is desired to measure the surface contours of a vertical cylindrical channel 57, which may for example be a fuel or control-rod channel in the core of a graphite-moderated nuclear reactor, the device is lowered into the hole by the grabhead beforementioned, which grips the extension piece 14. Thus the lower end of the device as seen in FIG. 1 is also the lower end when the device is in operation. During lowering, the probe 43 and the parts associated therewith are in the position shown in FIG. 5. In this position the oblique faces of the pawl 56 and trigger-plate lug 47 engage each other, and the locking sleeves 51 and 52 cover the driving wheel 18 and the feelers 35 respectively so as to hold them inside the body of the device and therefore away from the channel wall 58. The prongs 45 serve to protect the probe 43 from accidentally touching any obstruction in the channel 57 during lowering of the device.

When the probe 43 touches an upward projection (not shown) which is provided at the bottom of the channel 57, on further lowering of the device the probe, together with the trigger assembly and the locking sleeves 51 and 52, remains stationary while the remainder of the device continues downwards. This causes the driving wheel 18 and feelers 35 to move clear of the locking sleeves, so that the feelers move outwardly into the slots 52a in the sleeve 52, whereupon the springs 25a and 37 respectively urge the driving wheel and feelers against the channel wall 58 as seen in FIG. 1. At the same time the pawl 56 is urged by the locking spring arm 55 into engagement with the lug 47 as seen in FIG. 1, so as to lock the trigger assembly and therefore the sleeves 51 and 52 in position. The device is now ready to measure the contours of the channel.

Measurement of the contours of the channel wall 58 takes place as the device is raised up the channel 57 at constant speed by the grabhead. All eight guiding wheels are now in continuous contact with the channel wall, as are the feelers 35. As the device is raised, the driving wheel 18 rotates by friction with the channel wall, and drives the recording drum round through the gear train 28, worm 29 and worm wheel 30 and the shaft 31. As the drum 33 rotates, each stylus 41 scratches a continuous circumferential trace around the carburized surface of the drum. The ratio of the gears is so chosen that the drum 33 rotates for just under one revolution as the device travels up the full length of the channel.

Since the guiding wheels 15 to 18 are all in one reference plane and the remaining four guiding wheels are all in the other reference plane, perpendicular to it, and since each wheel has two treads 20, there is effectively no rotation of the device in the channel. Consequently, any movement of a feeler 35 as it encounters a change in the contour of the channel wall will always occur radially in whichever of the two reference planes the feeler is set. As the device is moved up the channel, therefore, each feeler, in response to a change in channel radius, moves its feeler arm 36 pivotally about the shaft 38: This causes the spring arm 40 to swing and so move its stylus 41 axially with respect to the drum 33, the deflection so produced being proportional to the change in channel radius.

Thus each stylus 41 produces a trace on the recording drum which represents the vertical contour of the channel as detected by the associated feeler 35. The four traces thereby produced define completely the contours of the channel in the two reference planes, which thus provide a convenient predetermined datum: when the intersection of the reference planes coincides with the axial centre line of the device, the trace on the drum is interpreted as showing no distortion. Deflection of the trace from this position shows a change of contour, and hence distortion of the channel.

When the device reaches the top of the channel, the slot 42 in the drum reaches its associated stylus, which is then urged into the slot 42 by its spring arm 40. After removal of the device from the channel 58, the upper housing 11 is unscrewed from the centre body member 13 and the drum 33 is removed so that any deflections of the traces on its surfaces can be measured.

Interpretation of each trace can be achieved by the use of a simple table or graph prepared for the purpose and showing the relationship between changes in channel radius and deflection of the trace. Since, as explained above, the contours are defined completely for the two reference planes, the complete shape of any section of the channel can easily be plotted by interpolation: thus any distortion of the wall 58 can be readily detected. The traces also provide information on other types of irregularity in the channel wall, such as "steps," tilted straight portion or gaps. The diameter of the channel, across each reference plane at any section, is the sum of the normal channel diameter and the recorded deflections of the two diametrically-opposite feelers 35 in that plane. The nominal channel diameter is the distance between the tips of the feelers as set before the device is lowered into the channel.

The use of two parallel treads 20 for the wheels of the device is an effective way of keeping the two reference planes in a constant azimuth as the device passes up the channel. An alternative method is to use some form of artificial guide: for example a withdrawable rod offset from the axis of the body, passing through longitudinally-extending holes therein and located in the channel during operation of the device. The use of four guiding wheels on axes fixed with respect to the body, the remaining four wheels being spring-mounted, ensures that all eight guiding wheels are in contact with the channel wall 58 at all times during operation of the device. The springs 37 serve merely to keep the feelers 35 in continuous contact with the stops 36a, so that each feeler 35 and its feeler arm 36 in fact respond as one unit to changes in wall contour. The springs 37 do not affect their response to changes in channel radius.

Devices such as that described may be used for measuring any channel of suitable size in the core of a nuclear reactor, or for any other application where the contours of a hole or channel which is long relative to its width are to be measured, suitable dimensions and materials being chosen for the device according to the application. If the feelers are of an appropriate size the device can also be used to measure elliptical channels.

It will be understood that the channel to be measured need not be vertical, if suitable means for drawing the device through the channel are provided. In this case the guiding wheels 15 and 17 are preferably arranged to run along a lower path from the remaining wheels, so that the vertical component of the weight of the device has no compressing effect on the springs 22 and 25a.

The feelers 35 need not be midway along the body of the device as described; for example they may be at one end, outboard of the wheels.

In suitable applications the recording surface of the drum may, instead of the carburized surface, be made of a wax or similar substance, or a detachable substance such as paper, ink pens being then used instead of the steel styli 41.

What we claim as our invention and desire to secure by Letters Patent is:

1. A hole-measuring device, for measuring changes in internal wall contour along the length of a hole of which the length is substantially greater than the width, comprising a body portion movable axially in the hole, guiding means carried by the body portion for guiding said device along the hole according to a datum predetermined with respect to the axis of the hole, sensing means carried by said body portion and arranged for movement relative to said body portion in response to changes in wall contour of the hole with respect to said datum, and recording means carried by said body portion, responsive to movement thereof along the hole and coupled to said sensing means for making a record of said contour in response to said movements of the body portion and of the sensing means, said predetermined datum comprising two mutually-perpendicular reference planes intersecting on a longitudinal axis of said body portion, and said guiding means being arranged to maintain said device with respect to said reference planes during movement thereof along the hole, and said sensing means being arranged with respect to said guiding means, so that said movement of said sensing means is always in said reference planes, said guiding means comprising two pairs of wall-engaging members in each reference plane, said wall-engaging members of each pair being on opposite sides of said reference plane perpendicular to said reference plane in which said pair lies, one wall-engaging member of each pair being resiliently mounted in said body portion, the other wall-engaging member being located in a position which is fixed with respect to the longitudinal axis of said body portion and also being arranged so that in each reference plane both said resiliently-mounted wall-engaging members in that plane are on the same side of the other reference plane as each other.

2. A hole-measuring device, for measuring changes in internal wall contour along the length of a hole of which the length is substantially greater than the width, comprising a body movable longitudinally in the hole, four pairs of wall-engaging guide wheels carried by the body portion, arranged with two of said pairs in each of two mutually-perpendicular reference planes intersecting on a longitudinal axis of the body, one guide wheel of each said pair being resiliently mounted in the body, the axis of the other being fixed with respect to said longitudinal axis, and both said resiliently-mounted guide wheels in each said reference plane being on the same side of the other reference plane as each other, sensing means carried by the body portion and arranged for movement relative thereto in response to changes in wall contour of the hole relative to said longitudinal axis, and recording means carried by the body portion, responsive to movement thereof along the hole and coupled to said sensing means for making a record of said wall contour in response to said movements of the body portion and of the sensing means.

3. A hole-measuring device according to claim 2, wherein said recording means comprises a cylindrical drum rotatable in response to said movement of the body portion along the hole and marking means coupled to the sensing means for making a continuous record on the outside cylindrical surface of the drum as the drum rotates and in response to said movement of the sensing means.

4. A hole-measuring device according to claim 3, wherein the sensing means comprise a plurality of feelers each of which lies in a said reference plane, the marking means comprising a plurality of markers each coupled to a different said feeler and movable in continuous contact with said surface of the drum in a plane parallel to the reference plane in which the corresponding feeler lies, and the axis of rotation of the drum coinciding with said longitudinal axis.

5. A hole-measuring device according to claim 3, including a wall-engaging drive wheel mounted resiliently on the body and retractable into said body away from the wall of the hole, and transmission means mounted in the body and coupled to said drive wheel and said drum so as to rotate said drum as the drive wheel rotates during said longitudinal movement of the device along the hole.

6. A hole-measuring device according to claim 5, including a guard member mounted in the body and movable therein between a first position in which it maintains said drive wheel retracted and a second position in which said drive wheel is released for engagement with the wall of the hole, and a probe member at one end of the body, movable axially with respect thereto in response to an externally-applied impulse and coupled to the guard member, so as to move the guard member from said first to said second position in response to said impulse.

References Cited by the Examiner

UNITED STATES PATENTS

| | | | |
|---|---|---|---|
| 2,030,244 | 2/1936 | Cox | 33—178 |
| 2,150,070 | 3/1939 | Kregecz | 33—178 |
| 2,708,316 | 5/1955 | Fredd | 33—178 |
| 2,946,130 | 7/1960 | Groner et al. | 33—178 |

ISAAC LISANN, *Primary Examiner.*

WILLIAM K. QUARLES, JR., *Assistant Examiner.*